United States Patent
Smith et al.

(10) Patent No.: US 9,800,293 B2
(45) Date of Patent: Oct. 24, 2017

(54) SYSTEM FOR CONFIGURING INDICIA READERS USING NFC TECHNOLOGY

(71) Applicant: Hand Held Products, Inc., Fort Mill, SC (US)

(72) Inventors: Taylor Smith, Charlotte, NC (US); Mark Schmidt, Morristown, NJ (US); Dayaker Mupkala, Andra Pradesh (IN); Manjunatha Aswathanarayana Swamy, Andhra Pradesh (IN); Mika Majapuro, Charlotte, NC (US); Qi Zhu, Jiangsu (CN); Xiaodong Zhou, Jiangsu (CN); Zhiqiang Yuan, Jiangsu (CN); Qinrong Zhu, Jiangsu (CN)

(73) Assignee: Hand Held Products, Inc., Fort Mill, SC (US)

(*) Notice: Subject to any disclaimer, the term of this patent is extended or adjusted under 35 U.S.C. 154(b) by 0 days.

(21) Appl. No.: 14/074,787

(22) Filed: Nov. 8, 2013

(65) Prior Publication Data

US 2015/0133047 A1    May 14, 2015

(51) Int. Cl.
 *H04B 5/00* (2006.01)
 *G06K 7/10* (2006.01)

(52) U.S. Cl.
 CPC ....... *H04B 5/0031* (2013.01); *G06K 7/10198* (2013.01)

(58) Field of Classification Search
 CPC ............................................... G06K 7/10198
 See application file for complete search history.

(56) References Cited

U.S. PATENT DOCUMENTS

| | | |
|---|---|---|
| 6,832,725 B2 | 12/2004 | Gardiner et al. |
| 7,159,783 B2 | 1/2007 | Walczyk et al. |
| 7,413,127 B2 | 8/2008 | Ehrhart et al. |
| 7,726,575 B2 | 6/2010 | Wang et al. |
| 8,294,969 B2 | 10/2012 | Plesko |
| 8,317,105 B2 | 11/2012 | Kotlarsky et al. |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |

(Continued)

FOREIGN PATENT DOCUMENTS

| | | |
|---|---|---|
| WO | 2013163789 A1 | 11/2013 |
| WO | 2013173985 A1 | 11/2013 |
| WO | 2014019130 A1 | 2/2014 |

OTHER PUBLICATIONS

U.S. Appl. No. 13/367,978, filed Feb. 7, 2012, (Feng et al.); now abandoned.

(Continued)

*Primary Examiner* — Hsin-Chun Liao
(74) *Attorney, Agent, or Firm* — Additon, Higgins & Pendleton, P.A.

(57) ABSTRACT

A near-field-communication (NFC) system includes an NFC-enabled indicia reader and a second NFC-enabled device. The NFC-enabled indicia reader is configured to receive software-configuration data from another NFC-enabled device. The NFC system is configured to update the NFC-enabled indicia reader with the software-configuration data of the second-NFC enabled device when the indicia reader is positioned in proximity to the second NFC-enabled device.

16 Claims, 3 Drawing Sheets

(56) References Cited

U.S. PATENT DOCUMENTS

| | | |
|---|---|---|
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 2007/0026801 A1* | 2/2007 | Gerstenkorn ............... 455/41.2 |
| 2007/0063048 A1 | 3/2007 | Havens et al. |
| 2007/0254712 A1* | 11/2007 | Chitti ............................ 455/558 |
| 2008/0185432 A1 | 8/2008 | Caballero et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0005497 A1 | 1/2012 | Tsukamoto et al. |
| 2012/0111946 A1 | 5/2012 | Golant |
| 2012/0138685 A1 | 6/2012 | Qu et al. |
| 2012/0168511 A1 | 7/2012 | Kotlarsky et al. |
| 2012/0168512 A1 | 7/2012 | Kotlarsky et al. |
| 2012/0193407 A1 | 8/2012 | Barten |
| 2012/0193423 A1 | 8/2012 | Samek |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2013/0043312 A1 | 2/2013 | Van Horn |
| 2013/0056285 A1 | 3/2013 | Meagher |
| 2013/0070322 A1 | 3/2013 | Fritz et al. |
| 2013/0075168 A1 | 3/2013 | Amundsen et al. |
| 2013/0082104 A1 | 4/2013 | Kearney et al. |
| 2013/0175341 A1 | 7/2013 | Kearney et al. |
| 2013/0175343 A1 | 7/2013 | Good |
| 2013/0200158 A1 | 8/2013 | Feng et al. |
| 2013/0214048 A1 | 8/2013 | Wilz |
| 2013/0256418 A1 | 10/2013 | Havens et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0278425 A1 | 10/2013 | Cunningham et al. |
| 2013/0287258 A1 | 10/2013 | Kearney |
| 2013/0292474 A1 | 11/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306730 A1 | 11/2013 | Brady et al. |
| 2013/0306731 A1 | 11/2013 | Pedraro |
| 2013/0306734 A1 | 11/2013 | Xian et al. |
| 2013/0307964 A1 | 11/2013 | Bremer et al. |
| 2013/0313324 A1 | 11/2013 | Koziol et al. |
| 2013/0313325 A1 | 11/2013 | Wilz et al. |
| 2013/0313326 A1 | 11/2013 | Ehrhart |
| 2013/0327834 A1 | 12/2013 | Hennick et al. |
| 2013/0341399 A1 | 12/2013 | Xian et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008430 A1 | 1/2014 | Soule et al. |
| 2014/0008439 A1 | 1/2014 | Wang |
| 2014/0021256 A1 | 1/2014 | Qu et al. |
| 2014/0025584 A1 | 1/2014 | Liu et al. |
| 2014/0027518 A1 | 1/2014 | Edmonds et al. |
| 2014/0034723 A1 | 2/2014 | Van Horn et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061305 A1 | 3/2014 | Nahill et al. |
| 2014/0061306 A1 | 3/2014 | Wu et al. |
| 2014/0061307 A1 | 3/2014 | Wang et al. |
| 2014/0063289 A1 | 3/2014 | Hussey et al. |

(56) References Cited

U.S. PATENT DOCUMENTS

| | | |
|---|---|---|
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0075846 A1 | 3/2014 | Woodburn |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0084068 A1 | 3/2014 | Gillet et al. |
| 2014/0086348 A1 | 3/2014 | Peake et al. |
| 2014/0097249 A1 | 4/2014 | Gomez et al. |
| 2014/0098284 A1 | 4/2014 | Oberpriller et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0133379 A1 | 5/2014 | Wang et al. |
| 2014/0140585 A1 | 5/2014 | Wang |
| 2014/0151453 A1 | 6/2014 | Meier et al. |
| 2014/0160329 A1 | 6/2014 | Ren et al. |

OTHER PUBLICATIONS

U.S. Appl. No. 13/736,139 for an Electronic Device Enclosure, filed Jan. 8, 2013 (Chaney); 40 pages.
U.S. Appl. No. 13/771,508 for an Optical Redirection Adapter, filed Feb. 20, 2013 (Anderson); 26 pages.
U.S. Appl. No. 13/780,356 for a Mobile Device Having Object Identification Interface, filed Feb. 28, 2013 (Samek et al.); 21 pages.
U.S. Appl. No. 13/852,097 for a System and Method for Capturing and Preserving Vehicle Event Data, filed Mar. 28, 2013 (Barker et al.); 20 pages.
U.S. Appl. No. 13/902,110 for a System and Method for Display of Information Using a Vehicle-Mount Computer, filed May 24, 2013 (Hollifield); 29 pages.
U.S. Appl. No. 13/902,144, for a System and Method for Display of Information Using a Vehicle-Mount Computer, filed May 24, 2013 (Chamberlin); 23 pages.
U.S. Appl. No. 13/902,242 for a System for Providing a Continuous Communication Link With a Symbol Reading Device, filed May 24, 2013 (Smith et al.); 24 pages.
U.S. Appl. No. 13/912,262 for a Method of Error Correction for 3D Imaging Device, filed Jun. 7, 2013 (Jovanovski et al.); 33 pages.
U.S. Appl. No. 13/912,702 for a System and Method for Reading Code Symbols at Long Range Using Source Power Control, filed Jun. 7, 2013 (Xian et al.); 24 pages.
U.S. Appl. No. 13/922,339 for a System and Method for Reading Code Symbols Using a Variable Field of View, filed Jun. 20, 2013 (Xian et al.); 23 pages.
U.S. Appl. No. 13/927,398 for a Code Symbol Reading System Having Adaptive Autofocus, filed Jun. 26, 2013 (Todeschini); 24 pages.
U.S. Appl. No. 13/930,913 for a Mobile Device Having an Improved User Interface for Reading Code Symbols, filed Jun. 28, 2013 (Gelay et al.); 24 pages.
U.S. Appl. No. 13/933,415 for an Electronic Device Case, filed Jul. 2, 2013 (London et al.); 47 pages.
U.S. Appl. No. 13/947,296 for a System and Method for Selectively Reading Code Symbols, filed Jul. 22, 2013 (Rueblinger et al.); 29 pages.
U.S. Appl. No. 13/950,544 for a Code Symbol Reading System Having Adjustable Object Detection, filed Jul. 25, 2013 (Jiang); 28 pages.
U.S. Appl. No. 13/961,408 for a Method for Manufacturing Laser Scanners, filed Aug. 7, 2013 (Saber et al.); 26 pages.
U.S. Appl. No. 14/018,729 for a Method for Operating a Laser Scanner, filed Sep. 5, 2013 (Feng et al.); 24 pages.
U.S. Appl. No. 14/019,616 for a Device Having Light Source to Reduce Surface Pathogens, filed Sep. 6, 2013 (Todeschini); 23 pages.
U.S. Appl. No. 14/023,762 for a Handheld Indicia Reader Having Locking Endcap, filed Sep. 11, 2013 (Gannon); 31 pages.
U.S. Appl. No. 14/035,474 for Augmented-Reality Signature Capture, filed Sep. 24, 2013 (Todeschini); 33 pages.
U.S. Appl. No. 14/047,896 for Terminal Having Illumination and Exposure Control filed Oct. 7, 2013 (Jovanovski et al.); 32 pages.
U.S. Appl. No. 14/053,175 for Imaging Apparatus Having Imaging Assembly, filed Oct. 14, 2013 (Barber); 39 pages.
U.S. Appl. No. 14/055,234 for Dimensioning System, filed Oct. 16, 2013 (Fletcher); 26 pages.
U.S. Appl. No. 14/053,314 for Indicia Reader, filed Oct. 14, 2013 (Huck); 29 pages.
U.S. Appl. No. 14/065,768 for Hybrid System and Method for Reading Indicia, filed Oct. 29, 2013 (Meier et al.); 22 pages.
U.S. Appl. No. 14/074,746 for Self-Checkout Shopping System, filed Nov. 8, 2013 (Hejl et al.); 26 pages.
U.S. Appl. No. 14/074,787 for Method and System for Configuring Mobile Devices via NFC Technology, filed Nov. 8, 2013 (Smith et al.); 28 pages.
U.S. Appl. No. 14/087,190 for Optimal Range Indicators for Bar Code Validation, filed Nov. 22, 2013 (Hejl); 27 pages.
U.S. Appl. No. 14/345,735 for Optical Indicia Reading Terminal with Combined Illumination filed Mar. 19, 2014 (Ouyang); 19 pages.
U.S. Appl. No. 14/101,965 for High Dynamic-Range Indicia Reading System, filed Dec. 10, 2013 (Xian); 28 pages.
U.S. Appl. No. 14/118,400 for Indicia Decoding Device with Security Lock, filed Nov. 18, 2013 (Liu); 28 pages.
U.S. Appl. No. 14/150,393 for Incicia-reader Having Unitary Construction Scanner, filed Jan. 8, 2014 (Colavito et al.); 28 pages.
U.S. Appl. No. 14/154,207 for Laser Barcode Scanner, filed Jan. 14, 2014 (Hou et al.); 26 pages.
U.S. Appl. No. 14/154,915 for Laser Scanning Module Employing a Laser Scanning Assembly having Elastomeric Wheel Hinges, filed Jan. 14, 2014 (Havens et al.); 24 pages.
U.S. Appl. No. 14/158,126 for Methods and Apparatus to Change a Feature Set on Data Collection Devices, filed Jan. 17, 2014 (Berthiaume et al.); 53 pages.
U.S. Appl. No. 14/342,551 for Terminal Having Image Data Format Conversion filed Mar. 4, 2014 (Lui et al.); 25 pages.
U.S. Appl. No. 14/342,544 for Imaging Based Barcode Scanner Engine with Multiple Elements Supported on a Common Printed Circuit Board filed Mar. 4, 2014 (Liu et al.); 27 pages.
U.S. Appl. No. 14/257,174 for Reading Apparatus Having Partial Frame Operating Mode filed Apr. 21, 2014, (Barber et al.), 67 pages.
U.S. Appl. No. 14/200,405 for Indicia Reader for Size-Limited Applications filed Mar. 7, 2014 (Feng et al.); 42 pages.
U.S. Appl. No. 14/166,103 for Indicia Reading Terminal Including Optical Filter filed Jan. 28, 2014 (Lu et al.); 29 pages.
U.S. Appl. No. 14/274,858 for Mobile Printer With Optional Battery Accessory, filed May 12, 2014, (Marty et al.), 26 pages.
U.S. Appl. No. 14/264,173 for Autofocus Lens System for Indicia Readers filed Apr. 29, 2014, (Ackley et al.), 39 pages.
U.S. Appl. No. 14/230,322 for Focus Module and Components with Actuator filed Mar. 31, 2014 (Feng et al.); 92 pages.

(56) References Cited

OTHER PUBLICATIONS

U.S. Appl. No. 14/222,994 for Method and Apparatus for Reading Optical Indicia Using a Plurality of Data filed Mar. 24, 2014 (Smith et al.); 30 pages.
U.S. Appl. No. 14/231,898 for Hand-Mounted Indicia-Reading Device with Finger Motion Triggering filed Apr. 1, 2014 (Van Horn et al.); 36 pages.
U.S. Appl. No. 29/486,759 for an Imaging Terminal, filed Apr. 2, 2014 (Oberpriller et al.); 8 pages.
U.S. Appl. No. 29/436,337 for an Electronic Device, filed Nov. 5, 2012 (Fitch et al.); 19 pages.
U.S. Appl. No. 29/458,405 for an Electronic Device, filed Jun. 19, 2013 (Fitch et al.); 22 pages.
U.S. Appl. No. 29/459,620 for an Electronic Device Enclosure, filed Jul. 2, 2013 (London et al.); 21 pages.
U.S. Appl. No. 29/459,681 for an Electronic Device Enclosure, filed Jul. 2, 2013 (Chaney et al.); 14 pages.
U.S. Appl. No. 29/459,785 for a Scanner and Charging Base, filed Jul. 3, 2013 (Fitch et al.); 21 pages.
U.S. Appl. No. 29/459,823 for a Scanner, filed Jul. 3, 2013 (Zhou et al.); 13 pages.
U.S. Appl. No. 29/468,118 for an Electronic Device Case, filed Sep. 26, 2013 (Oberpriller et al.); 44 pages.
EP Extended Search Report and Written Opinion for related EP Application No. 14188332.2, Dated Jul. 23, 2015, 12 pages.
EP Partial Search Report for EP Application No. 14188332.2, Dated Mar. 16, 2015, 6 pages.

* cited by examiner

SYSTEM FOR CONFIGURING INDICIA READERS USING NFC TECHNOLOGY

FIELD OF THE INVENTION

The present invention relates to the field of indicia readers, more specifically, to a near-field-communication system for configuring an indicia reader.

BACKGROUND

Indicia readers, such as barcode readers, are widely used by businesses to supplant manual entry of data into information systems. Such indicia readers have proven particularly useful, for example, in managing inventory because of the relative speed and accuracy with which information like product numbers can be entered.

Indicia readers typically include a processor that executes software (e.g., firmware). The software contains the instructions that permit the indicia reader to scan indicia. In general, the software can be modified or replaced when it is desirable to add to or alter the functionality of the indicia reader. For example, a user of an indicia reader may desire to increase the volume of the scan indicator signal (e.g., due to a noisy environment), or to increase the brightness of the scan line (e.g., to make the scan line more visible). In addition, the manufacturer of the indicia reader may release updates to the software to improve its functionality.

There traditionally have been two primary ways of configuring an indicia reader and/or updating its software. The indicia reader may be connected to another computer device (e.g., a laptop computer) that is capable of receiving configuration commands and/or software upgrades and transmitting them to the indicia reader (e.g., via a USB connection). Another common method of configuring the indicia reader is by scanning configuration indicia (e.g., configuration barcodes). Indicia readers are typically designed to read these configuration indicia and adjust their configuration settings accordingly. For example, scanning a particular configuration barcode may cause the indicia reader to enter presentation mode.

Connecting the indicia reader to another device and/or utilizing configuration indicia do permit configuration changes and software updates to indicia readers. Connecting a computer device to the indicia reader to achieve updating or configuration is not ideal because it requires significant time and expense to connect to and update each one of a business' entire collection of indicia readers. Similarly, utilizing configuration indicia to reconfigure an indicia reader is problematic because it requires training of personnel in how to use the configuration indicia, and it requires storage and widespread dissemination of all of the configuration indicia.

Therefore, a need exists for a system that allows indicia readers to be updated and/or reconfigured more quickly and more easily than can be done using traditional methods.

SUMMARY

Accordingly, in one aspect, the present invention embraces a near-field-communication (NFC) system that includes a first NFC-enabled device. The first NFC-enabled device is configured to receive software-configuration data from another NFC-enabled device(s). The NFC system also includes a second NFC-enabled device having software-configuration data. The NFC system is configured to update the first NFC-enabled device with the software-configuration data of the second NFC-enabled device when the first NFC-enabled device is positioned in proximity to the second NFC-enabled device.

In an exemplary embodiment, the second NFC-enabled device of the NFC system according to the present invention is configured to transmit software-configuration data to another NFC-enabled device.

In another exemplary embodiment, the NFC system according to the present invention is configured to automatically update the first NFC-enabled device with the software-configuration data of the second-NFC enabled device when the first NFC-enabled device is positioned in proximity to the second NFC-enabled device.

In yet another exemplary embodiment, the NFC system according to the present invention is configured to update the first NFC-enabled device with the software configuration data of the second NFC-enabled device when (i) the first NFC-enabled device is positioned in proximity to the second NFC-enabled device and (ii) a user of the first NFC-enabled device manually authorizes the first NFC-enabled device to receive and install the software-configuration data of the second NFC-enabled device.

In yet another exemplary embodiment, the second NFC-enabled device comprises a graphical user interface (GUI) application. The user of the second NFC-enabled device operates the graphical user interface (GUI) application to manually command the second NFC-enabled device to transmit the software-configuration data to the first NFC-enabled device.

In yet another exemplary embodiment, the second NFC-enabled device includes a transmission-initiation switch. The user of the second NFC-enabled device activates the transmission-initiation switch to manually command the second NFC-enabled device to transmit the software-configuration data to the first NFC-enabled device.

In yet another exemplary embodiment, the first NFC-enabled device is an indicia reader.

In yet another exemplary embodiment, the first NFC-enabled device is an indicia reader and the software-configuration data includes device parameter settings for the indicia reader.

In yet another exemplary embodiment, the first NFC-enabled device is a computerized elevator controller.

In yet another exemplary embodiment, the first NFC-enabled device is a computerized elevator controller and the software-configuration data includes destination instructions for moving the elevator to a pre-determined building level.

In yet another exemplary embodiment, the second NFC-enabled device is a mobile computer device.

In another aspect, the present invention embraces a near-field-communication (NFC) system that includes an NFC-enabled indicia reader. The NFC-enabled indicia reader is configured to receive software-configuration data from another NFC-enabled device. The NFC system is configured to update the NFC-enabled indicia reader with software-configuration data of a second NFC-enabled device. The update occurs when the NFC-enabled indicia reader is positioned in proximity to the second NFC-enabled device.

In an exemplary embodiment, the second NFC-enabled device of the near-field-communication (NFC) system according to the present invention automatically transmits the software-configuration data to the NFC-enabled indicia reader.

In another exemplary embodiment, the user of the second NFC-enabled device manually commands the second NFC-enabled device to transmit the software-configuration data to the NFC-enabled indicia reader.

In yet another exemplary embodiment, the software-configuration data includes device parameter settings for the NFC-enabled indicia reader.

In yet another exemplary embodiment, the device parameter settings are set by the user of the second NFC-enabled device.

In yet another exemplary embodiment, the second-NFC enabled device comprises a mobile computer device.

In yet another exemplary embodiment, the second-NFC enabled device comprises an NFC-enabled indicia reader.

In another aspect, the present invention embraces a near-field communication (NFC) system that includes an NFC-enabled indicia reader. The NFC-enabled indicia reader decodes indicia, acquires from a database information associated with the decoded indicia, and transmits the information associated with the decoded indicia to another NFC-enabled device.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces a near-field-communication (NFC) system. The NFC system facilitates the configuration of indicia readers. In the context of this disclosure, and without limiting the claims herein, an indicia reader is any device adapted to read and decode indicia. Indicia include any machine-readable codes, including barcodes, 1D barcodes, 2D barcodes, matrix codes, QR codes, IR tags, RFID tags, NFC smartchips, and characters capable of being read by optical character recognition techniques.

Rather than relying on the cumbersome technique of individually connecting to each indicia reader (e.g., barcode reader, barcode scanner, RFID reader) with a device having a user interface (e.g., a laptop computer) to modify the software settings of the indicia reader, the system according to the present invention utilizes near-field-communication (NFC) technology. NFC is a communication protocol that allows portable electronic devices to establish wireless communications with each other using electromagnetic radio fields instead of conventional radio communications typically utilized in similar communication networks (e.g., wireless LAN). In contrast to conventional radio communication systems that typically require a powered radio transmitter and a powered radio receiver, the NFC communication link is initiated when two NFC-capable devices touch or are brought into close proximity with each other (e.g., a few centimeters). NFC is a way to create a personal area network between NFC-capable devices similar to other personal area network technologies (e.g., BLUETOOTH® radio). The advantage of using the NFC protocol is that it requires much less time to establish a connection between devices using the NFC protocol. Using NFC, then, the process of transferring information from one device to another device is much quicker and simpler than other communication techniques.

The system according to the present invention capitalizes on the relative ease of transmitting information between devices using NFC. Indicia readers are updated and/or configured by touching them or bringing them into proximity with an NFC-enabled device having the update in storage (e.g., memory). The indicia reader receives the update from the NFC-enabled device via an NFC communication link.

Figure 1:
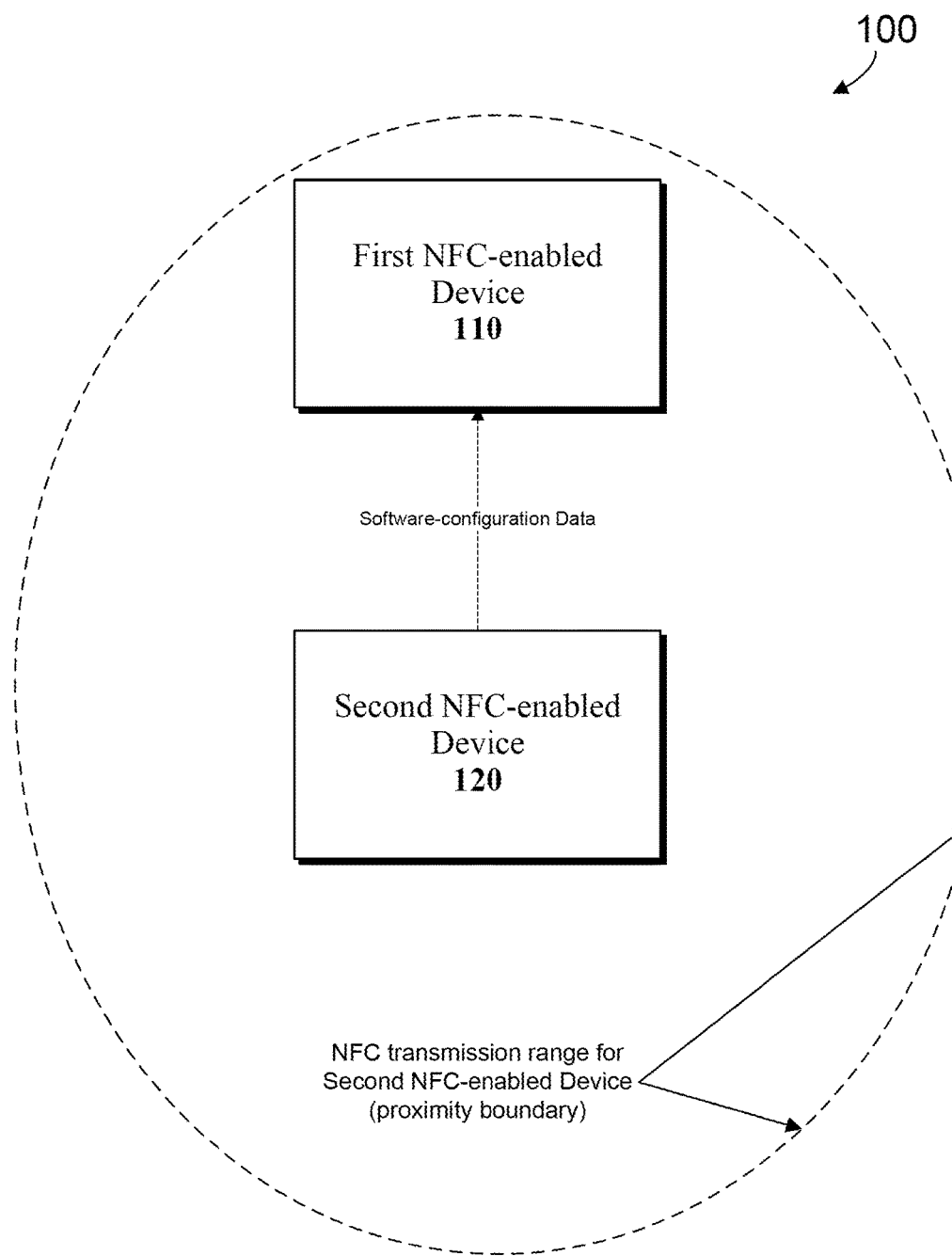
FIG. 1 is a block diagram illustration of an exemplary near-field-communication (NFC) system according to the present invention.

Referring now to FIG. 1, the near-field-communication system 100 according to the present invention includes a first NFC-enabled device 110 configured to receive software-configuration data from another NFC-enabled device. Software-configuration data includes software, software updates or upgrades, as well as device configuration settings. In general, the first NFC-enabled device 110 is an active device in that it can both receive and send information (e.g., software-configuration data) using NFC.

The near-field-communication (NFC) system 100 according to the present invention also includes a second NFC-enabled device 120. The second NFC-enabled device 120 has (e.g., stores in memory) software-configuration data. The second NFC-enabled device 120 could be a passive NFC device in that it only transmits software-configuration data via the NFC communication link. Typically, however, the second NFC-enabled device 120 will be an active NFC device capable of sending and receiving data, including software-configuration data, to another NFC-enabled device over an NFC communication link.

The near-field-communication (NFC) system 100 is configured to update the first NFC-enabled device with the software-configuration data of the second NFC-enabled device when the first NFC-enabled device is positioned in proximity to the second NFC-enabled device 120. It will be appreciated by a person of ordinary skill in the art that NFC devices are in proximity to each other when they are either (i) touching each other or (ii) within the maximum range that data may successfully be transmitted via an NFC communication link (e.g., within a few centimeters (e.g., within about 30 centimeters)).

In certain business applications, it may be desirable to minimize as much as possible the time and effort needed to execute the exchange of software-configuration data between devices. The near-field-communication (NFC) system 100 according to the present invention may be configured to automatically update the first NFC-enabled device 110 with the software-configuration data of the second NFC-enabled device 120. When the first NFC-enabled device 110 is positioned in proximity to the second NFC-enabled device 120, the second NFC-enabled device 120 automatically transmits the software-configuration data to the first NFC-enabled device 110. Using this automatic update feature, large numbers of devices could be updated with minimal time and effort by bringing a single device into proximity with each device requiring updating/configuring. The automatic update capability minimizes or eliminates the need for actions by the user, thereby reducing the time required to complete the necessary transfer of software-configuration data.

In an alternative embodiment, the near-field-communication (NFC) system 100 according to the present invention is configured to update the first NFC-enabled device 110 with the software-configuration data of the second NFC-enabled device 120 when (i) the first NFC-enabled device 110 is positioned in proximity to the second NFC-enabled device 120, and (ii) an operator of the first NFC-enabled device 110 manually authorizes the first NFC-enabled device 110 to receive and install the software-configuration data of the second NFC-enabled device 120. This approach may be preferable in situations where it is more important to ensure the update/configuration progresses as desired than it is to achieve fast and efficient updating/configuration. In addition, this approach tends to achieve greater security in that the operator of the first NFC-enabled device 110 can ensure that only authorized updates/configurations will be installed on the first NFC-enabled device 110.

In an alternative embodiment, the near-field-communication (NFC) system 100 according to the present invention is configured to update the first NFC-enabled device 110 with the software-configuration data of the second NFC-enabled device 120 when (i) the first NFC-enabled device 110 is positioned in proximity to the second NFC-enabled device 120, and (ii) a user of the second NFC-enabled device 120 manually commands the second NFC-enabled device 120 to transmit (e.g., push) the software-configuration data to the first NFC-enabled device 110. This embodiment may be preferable in situations where a user of a second NFC-enabled device 120 only wishes to update selected devices. To avoid uncontrolled updates to any device that comes into proximity with the second NFC-enabled device 120, the system provides that the user of the second NFC-enabled device 120 must authorize the update/configuration on the given first NFC-enabled device 110. For example, when the second NFC-enabled device 120 establishes an NFC communication link with a first NFC-enabled device 110, the second NFC-enabled device 120 may prompt the user of the second NFC-enabled device to either transmit the software-configuration data to the first NFC-enabled device 110 or ignore the first NFC-enabled device 110 either temporarily or permanently.

In an exemplary embodiment, the NFC system's second NFC-enabled device 120 has a graphical user interface (GUI) application for facilitating user input into the second NFC-enabled device 120. Typically, the second NFC-enabled device 120 has a display screen (e.g., LCD screen) for displaying the graphical user interface generated by the graphical user interface application. In general, the user of the second NFC-enabled device 120 operates the graphical user interface application to manually command the second NFC-enabled device to transmit the software-configuration data to the first NFC-enabled device 110.

In an alternative embodiment of the NFC system 100 according to the present invention, the second NFC-enabled device 120 includes a transmission-initiation switch 130 for allowing a user to determine when to manually transmit software-configuration to another NFC-enabled device. Typically, the transmission-initiation switch 130 is a button or a trigger disposed on the second NFC-enabled device. In the NFC system 100 according to the present invention, the user activates the transmission-initiation switch 130 to manually command the second NFC-enabled device 120 to transmit the software-configuration data to the first NFC-enabled device 110.

Figure 2:
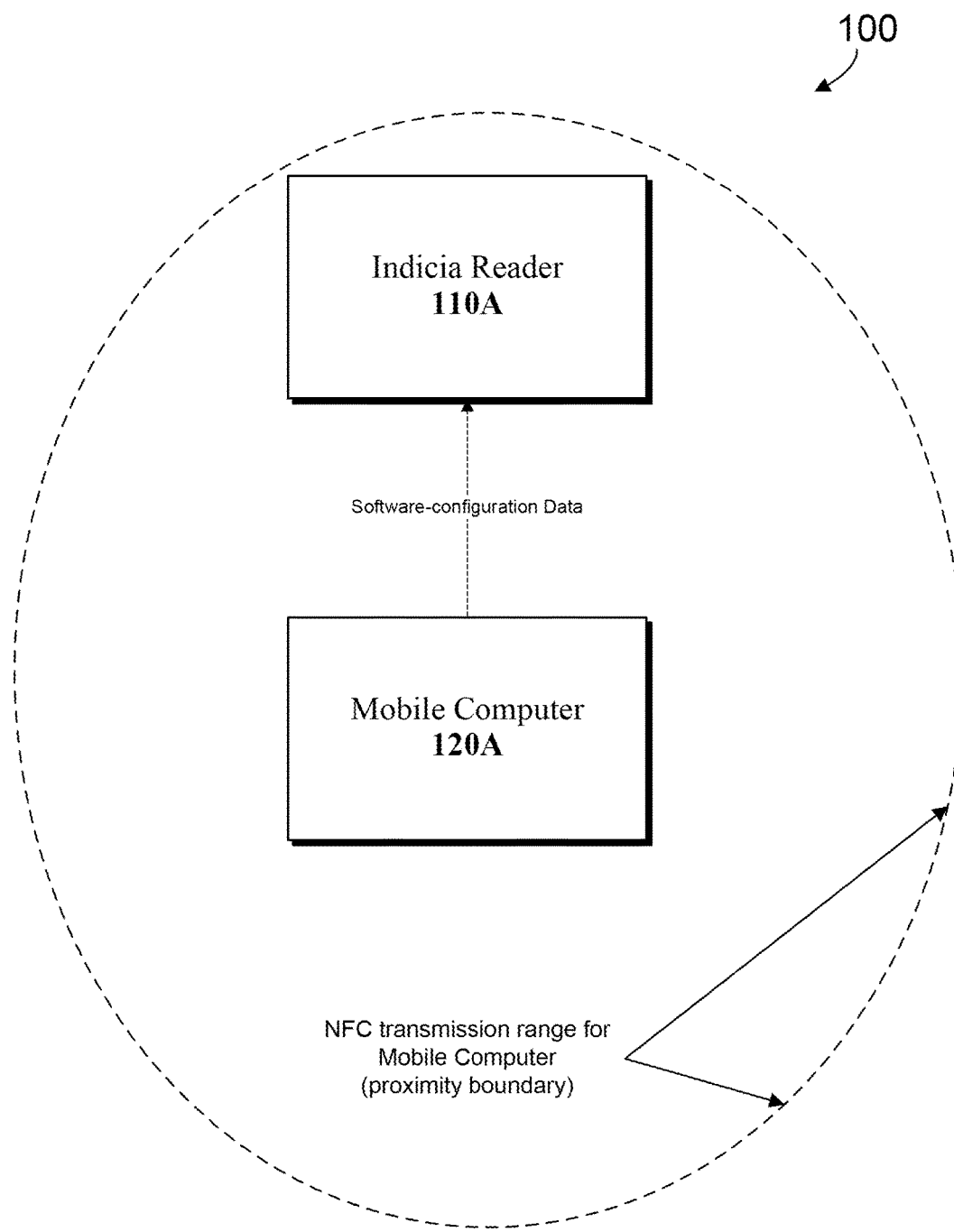
FIG. 2 is a block diagram illustration of a first alternative exemplary near-field-communication (NFC) system according to the present invention.

FIG. 2 is a block diagram illustrating an alternative embodiment of the NFC system 100 according to the present invention. In this alternative embodiment, the first NFC-enabled device is an indicia reader 110A. The indicia reader may be a barcode reader, barcode scanner, RFID reader (active or passive), scanner, optical character recognition (OCR) device imager, or other type of device capable of reading and decoding machine-readable symbols. The indicia reader 110A may be configured to acquire from a database information associated with the decoded indicia. For example, the indicia reader 110A may be configured to acquire from a database product information associated with a product number acquired through decoding a barcode. The indicia reader 110A may acquire the information from a database through a wired or wireless communication link (e.g., wireless LAN, wireless WAN, etc.).

In the case of a large retail store employing multiple (e.g., dozens) of indicia readers at point-of-sale and inventory locations within each store, the NFC system 100 according to the present invention can be used to quickly and efficiently update and/or configure the retailer's indicia readers 110A. A second NFC-enabled device 120 is taken to the location of each indicia reader 110A. In the embodiment of the NFC system 100 illustrated in FIG. 2, the second NFC-enabled device is a mobile computer 120A, such as a smartphone, tablet computer, or laptop computer. After positioning the mobile computer 120A in proximity to the indicia reader 110A, the mobile computer 120A transfers (either manually or automatically, as described above) software-configuration data to the indicia reader 110A via an NFC link. In this illustrative example, the software-configuration data may include device parameter settings (e.g., indicator sound level, laser brightness) for the indicia reader 110A. Because the NFC link can be established relatively quickly between the mobile computer 120A and each indicia reader 110A, the configuration process progresses much quicker than traditional methods such as connecting the devices using a USB cable or serial cable.

In the alternative, software-configuration data could be transmitted to the indicia reader(s) 110A by another indicia reader 110A. In this scenario, the NFC system's second NFC-enabled device is an indicia reader 110A. This approach can be used to quickly disseminate software-configuration data across an entire array of indicia readers by using the indicia readers themselves to propagate the updates/configurations contained in the software-configuration data. By way of example, an updated/configured indicia reader can transmit via NFC its software-configuration to the next indicia reader, which can in turn transmit the software-configuration data to the next indicia reader, and so on until all indicia readers are updated/configured.

Figure 3:
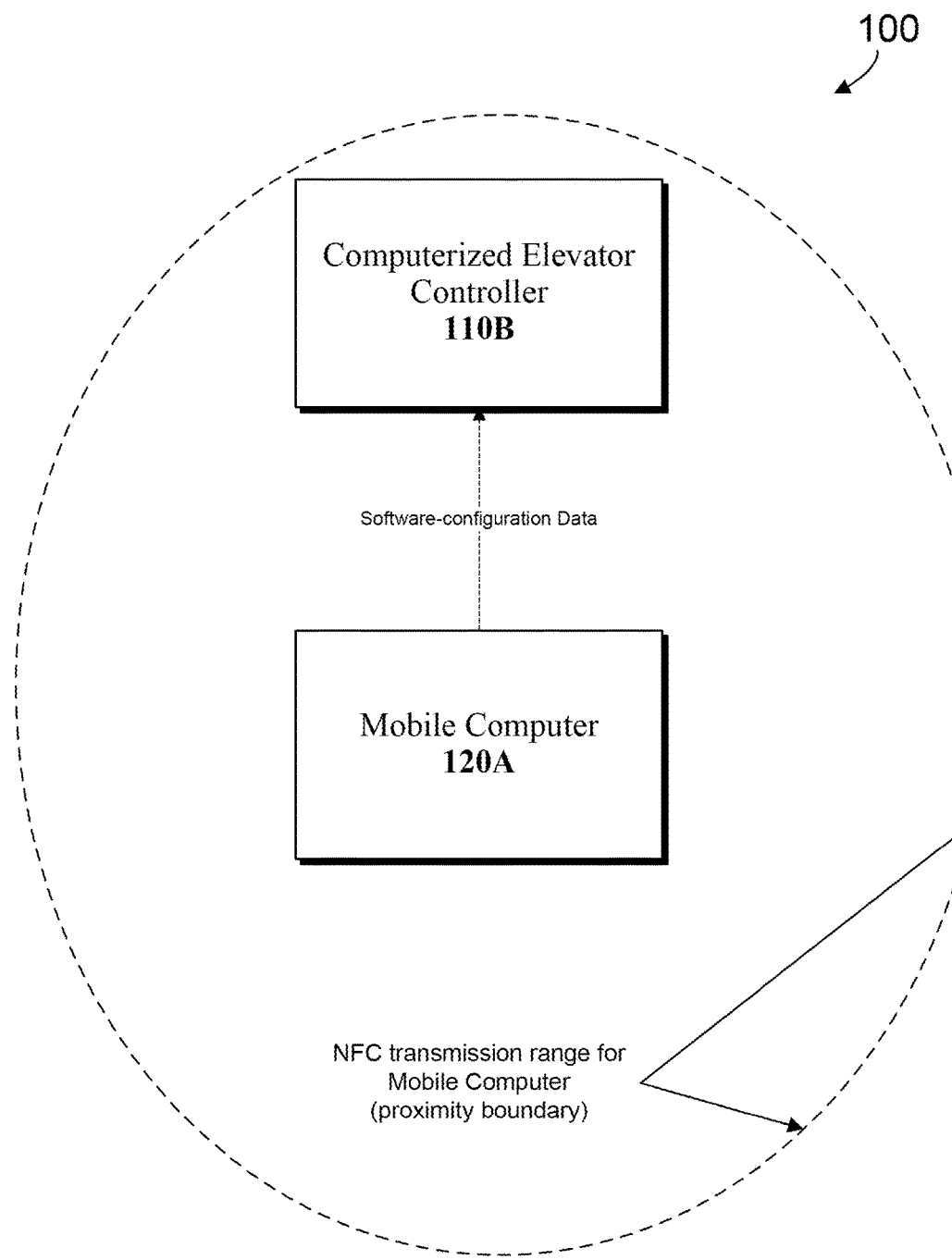
FIG. 3 is a block diagram illustration of a second alternative exemplary near-field-communication (NFC) system according to the present invention.

FIG. 3 is a block diagram illustrating another alternative embodiment of the NFC system 100 according to the present invention. In this illustrative embodiment, the first NFC-enabled device is a computerized elevator controller 110B. The computerized elevator controller 110B may be any type of computer-based controller that is used to operate an elevator. Without intending to limit the claims in any way, a computerized elevator controller 110B may include, for example, traditional keypad controllers commonly found inside an elevator, elevator call buttons typically found on each floor near the elevator access door, as well as destination control systems commonly used to control skyscraper elevators. Rather than selecting a destination floor or calling the elevator by depressing a number key or an arrow key, the NFC system 100 according to the present invention permits a user to use an NFC-enabled mobile computer 120A to select the destination floor. Typically, the user selects the destination floor by entering information into the mobile computer 120A. The mobile computer 120A communicates the user's destination choice in the form of software-configuration data via an NFC link with the computerized elevator controller 110B, which NFC link is established when the user positions the mobile computer 110A in proximity to the mobile computer device 120A. The computerized elevator controller 110B uses the software-configuration data received from the mobile computer 120A to determine the destination of the elevator car. For example, a user may simply enter the number "3" into the user's mobile computer 120A, which may be running an elevator control application, and then place the mobile computer 120A in proximity with the computerized elevator controller 110B, which will then direct the elevator car to take the user to the third floor. An advantage of this approach is that it does not require the user to touch any elevator buttons that are frequently touched by other people. The user is only required to touch the user's mobile computer 110B. Because the operation of an elevator using the NFC system 100 according to the present invention does not require touching of a common surface such as an elevator button, the NFC system 100 reduces the likelihood of spreading germs through cross-contamination.

Another advantage of this alternative embodiment of the NFC system 100 according to the present invention is that it facilitates the implementation of more complex elevator control algorithms that allow elevators to operate more quickly, more efficiently, and with greater user satisfaction than traditional methods. In particular, the NFC system 100 can be used to implement a "smart" destination control system that can automatically detect the appropriate destination for a user, often without need for any immediate action by the user. For example, the NFC system's computerized elevator controller 110A can "remember" that a user lives on a particular floor of an apartment complex. Whenever the user's mobile device 120A is brought into proximity with the computerized elevator controller 110A, the computerized elevator controller 110A recognizes the device as belonging to the user and automatically transports the user to the appropriate floor (e.g., automatically upon entering the elevator car). Similarly, this exemplary embodiment of the NFC system 100 can be used by hospitals or other organizations to facilitate the quick movement of workers to appropriate destination. For example, when a hospital worker is given medication to administer to a particular patient, software-configuration data containing the location of the patient could be automatically transmitted to the hospital worker's mobile computer 120A (e.g., via NFC or wireless LAN transmission). When the hospital worker enters the elevator car, the software-configuration data is automatically transmitted via NFC link from the hospital worker's mobile computer 120A to the computerized elevator controller 110A. The computerized elevator controller 110A, in turn, directs the elevator car to patient's floor. Not only does this approach simplify the hospital worker's job (e.g., by eliminating the need to look up the patient floor number, by eliminating the need to depress elevator buttons while carrying objects such as medicine dispensers), but it also reduces the spread of germs through contact with common surfaces like elevator buttons. The hospital worker's duties could further be facilitated by the incorporation of NFC-enabled devices along the corridors of the hospital that provide indicators to the hospital worker, such as the exact location of a particular patient, when brought into proximity with the hospital worker's mobile computer 120A.

NFC standards typically use 13.56 MHz to communicate and exchange data. These NFC standards are typically based on existing passive RFID standards from ISO, EPCglobal, NFC Forum and the like. To supplement the present disclosure, the following NFC-related standards are incorporated herein by reference: ISO/IEC 14443; ISO 15693; ISO/IEC 18000 including Parts 3 and 4; ISO/IEC 18092/ECMA-340-Near Field Communication Interface and Protocol-1 (NFCIP-1); ISO/IEC 21481/ECMA-352-Near Field Communication Interface and Protocol-2 (NFCIP-2); EPCglobal-13.56 MHz ISM Band Class 1 Gen 2 Radio Frequency (RF) Identification Tag Interface Specification; NPC Forum-specifications proposed by various smartphone companies.

To supplement the present disclosure, this application incorporates entirely by reference the following patents, patent application publications, and patent applications: U.S. Pat. No. 6,832,725; U.S. Pat. No. 7,159,783; U.S. Pat. No. 7,128,266; U.S. Pat. No. 7,413,127; U.S. Pat. No. 7,726,575; U.S. Pat. No. 8,390,909; U.S. Pat. No. 8,294,969; U.S. Pat. No. 8,408,469; U.S. Pat. No. 8,408,468; U.S. Pat. No. 8,381,979; U.S. Pat. No. 8,408,464; U.S. Pat. No. 8,317,105; U.S. Pat. No. 8,366,005; U.S. Pat. No. 8,424,768; U.S. Pat. No. 8,322,622; U.S. Pat. No. 8,371,507; U.S. Pat. No. 8,376,233; U.S. Pat. No. 8,457,013; U.S. Pat. No. 8,448,863; U.S. Pat. No. 8,459,557; U.S. Pat. No. 8,469,272; U.S. Pat. No. 8,474,712; U.S. Pat. No. 8,479,992; U.S. Pat. No. 8,490,877; U.S. Pat. No. 8,517,271; U.S. Pat. No. 8,556,176 U.S. Pat. No. 8,561,905; U.S. Pat. No. 8,523,076; U.S. Pat. No. 8,528,819; U.S. Patent Application Publication No. 2012/0111946; U.S. Patent Application Publication No. 2012/0223141; U.S. Patent Application Publication No. 2012/0193423; U.S. Patent Application Publication No. 2012/0203647; U.S. Patent Application Publication No. 2012/0248188; U.S. Patent Application Publication No. 2012/0228382; U.S. Patent Application Publication No. 2012/0193407; U.S. Patent Application Publication No. 2012/0168511; U.S. Patent Application Publication No. 2012/0168512; U.S. Patent Application Publication No. 2010/0177749; U.S. Patent Application Publication No. 2010/0177080; U.S. Patent Application Publication No. 2010/0177707; U.S. Patent Application Publication No. 2010/0177076; U.S. Patent Application Publication No. 2009/0134221; U.S. Patent Application Publication No. 2012/0318869; U.S. Patent Application Publication No. 2013/0043312; U.S. Patent Application Publication No. 2013/0068840; U.S. Patent Application Publication No. 2013/0070322; U.S. Patent Application Publication No. 2013/0075168; U.S. Patent Application Publication No. 2013/0056285; U.S. Patent Application Publication No. 2013/0075464; U.S. Patent Application Publication No. 2013/0082104; U.S. Patent Application Publication No. 2010/0225757; U.S. Patent Application Publication No. 2013/0175343; U.S. patent application Ser. No. 13/347,193 for a Hybrid-Type Bioptical Laser Scanning And Digital Imaging System Employing Digital Imager With Field Of View Overlapping Field Of Field Of Laser Scanning Subsystem, filed Jan. 10, 2012 (Kearney et al.); U.S. patent application Ser. No. 13/367,047 for Laser Scanning Modules Embodying Silicone Scan Element With Torsional Hinges, filed Feb. 6, 2012 (Feng et al.); U.S. patent application Ser. No. 13/400,748 for a Laser Scanning Bar Code Symbol Reading System Having Intelligent Scan Sweep Angle Adjustment Capabilities Over The Working Range Of The System For Optimized Bar Code Symbol Reading Performance, filed Feb. 21, 2012 (Wilz); U.S. patent application Ser. No. 13/432,197 for a Laser Scanning System Using Laser Beam Sources For Producing Long And Short Wavelengths In Combination With Beam-Waist Extending Optics To Extend The Depth Of Field Thereof While Resolving High Resolution Bar Code Symbols Having Minimum Code Element Widths, filed Mar. 28, 2012 (Havens et al.); U.S. patent application Ser. No. 13/492,883 for a Laser Scanning Module With Rotatably Adjustable Laser Scanning Assembly, filed Jun. 10, 2012 (Hennick et al.); U.S. patent application Ser. No. 13/367,978 for a Laser Scanning Module Employing An Elastomeric U-Hinge Based Laser Scanning Assembly, filed Feb. 7, 2012 (Feng et al.); U.S. patent application Ser. No. 13/852,097 for a System and Method for Capturing and Preserving Vehicle Event Data, filed Mar. 28, 2013 (Barker et al.); U.S. patent application Ser. No. 13/780,356 for a Mobile Device Having Object-Identification Interface, filed Feb. 28, 2013 (Samek et al.); U.S. patent application Ser. No. 13/780,158 for a Distraction Avoidance System, filed Feb. 28, 2013 (Sauerwein); U.S. patent application Ser. No. 13/784,933 for an Integrated Dimensioning and Weighing System, filed Mar. 5, 2013 (McCloskey et al.); U.S. patent application Ser. No. 13/785,177 for a Dimensioning System, filed Mar. 5, 2013 (McCloskey et al.); U.S. patent application Ser. No. 13/780,196 for Android Bound Service Camera Initialization, filed Feb. 28, 2013 (Todeschini et al.); U.S. patent application Ser. No. 13/792,322 for a Replaceable Connector, filed Mar. 11, 2013 (Skvoretz); U.S. patent application Ser. No. 13/780,271 for a Vehicle Computer System with Transparent Display, filed Feb. 28, 2013 (Fitch et al.); U.S. patent application Ser. No. 13/736,139 for an Electronic Device Enclosure, filed Jan. 8, 2013 (Chaney); U.S. patent application Ser. No. 13/771,508 for an Optical Redirection Adapter, filed Feb. 20, 2013 (Anderson); U.S. patent application Ser. No. 13/750,304 for Measuring Object Dimensions Using Mobile Computer, filed Jan. 25, 2013; U.S. patent application Ser. No. 13/471,973 for Terminals and Methods for Dimensioning Objects, filed May 15, 2012; U.S. patent application Ser. No. 13/895,846 for a Method of Programming a Symbol Reading System, filed Apr. 10, 2013 (Corcoran); U.S. patent application Ser. No. 13/867,386 for a Point of Sale (POS) Based Checkout System Supporting a Customer-Transparent Two-Factor Authentication Process During Product Checkout Operations, filed Apr. 22, 2013 (Cunningham et al.); U.S. patent application Ser. No. 13/888,884 for an Indicia Reading System Employing Digital Gain Control, filed May 7, 2013 (Xian et al.); U.S. patent application Ser. No. 13/895,616 for a Laser Scanning Code Symbol Reading System Employing Multi-Channel Scan Data Signal Processing with Synchronized Digital Gain Control (SDGC) for Full Range Scanning, filed May 16, 2013 (Xian et al.); U.S. patent application Ser. No. 13/897,512 for a Laser Scanning Code Symbol Reading System Providing Improved Control over the Length and Intensity Characteristics of a Laser Scan Line Projected Therefrom Using Laser Source Blanking Control, filed May 20, 2013 (Brady et al.); U.S. patent application Ser. No. 13/897,634 for a Laser Scanning Code Symbol Reading System Employing Programmable Decode Time-Window Filtering, filed May 20, 2013 (Wilz, Sr. et al.); U.S. patent application Ser. No. 13/902,242 for a System For Providing A Continuous Communication Link With A Symbol Reading Device, filed May 24, 2013 (Smith et al.); U.S. patent application Ser. No. 13/902,144, for a System and Method for Display of Information Using a Vehicle-Mount Computer, filed May 24, 2013 (Chamberlin); U.S. patent application Ser. No. 13/902,110 for a System and Method for Display of Information Using a Vehicle-Mount Computer, filed May 24, 2013 (Hollifield); U.S. patent application Ser. No. 13/912,262 for a Method of Error Correction for 3D Imaging Device, filed Jun. 7, 2013 (Jovanovski et al.); U.S. patent application Ser. No. 13/912,702 for a System and Method for Reading Code Symbols at Long Range Using Source Power Control, filed Jun. 7, 2013 (Xian et al.); U.S. patent application Ser. No. 13/922,339 for a System and Method for Reading Code Symbols Using a Variable Field of View, filed Jun. 20, 2013 (Xian et al.); U.S. patent application Ser. No. 13/927,398 for a Code Symbol Reading System Having Adaptive Autofocus, filed Jun. 26, 2013 (Todeschini); U.S. patent application Ser. No. 13/930,913 for a Mobile Device Having an Improved User Interface for Reading Code Symbols, filed Jun. 28, 2013 (Gelay et al.); U.S. patent application Ser. No. 13/933,415 for an Electronic Device Case, filed Jul. 2, 2013 (London et al.); U.S. patent application Ser. No. 13/947,296 for a System and Method for Selectively Reading Code Symbols, filed Jul. 22, 2013 (Rueblinger et al.); U.S. patent application Ser. No. 13/950,544 for a Code Symbol Reading System Having Adjustable Object Detection, filed Jul. 25, 2013 (Jiang); U.S. patent application Ser. No. 13/961,408 for a Method for Manufacturing Laser Scanners, filed Aug. 7, 2013 (Saber et al.); U.S. patent application Ser. No. 13/973,315 for a Symbol Reading System Having Predictive Diagnostics, filed Aug. 22, 2013 (Nahill et al.); U.S. patent application Ser. No. 13/973,354 for a Pairing Method for Wireless Scanner via RFID, filed Aug. 22, 2013 (Wu et al.); U.S. patent application Ser. No. 13/974,374 for Authenticating Parcel Consignees with Indicia Decoding Devices, filed Aug. 23, 2013 (Ye et al.); U.S. patent application Ser. No. 14/018,729 for a Method for Operating a Laser Scanner, filed Sep. 5, 2013 (Feng et al.); U.S. patent application Ser. No. 14/019,616 for a Device Having Light Source to Reduce Surface Pathogens, filed Sep. 6, 2013 (Todeschini); U.S. patent application Ser. No. 14/023,762 for a Handheld Indicia Reader Having Locking Endcap, filed Sep. 11, 2013 (Gannon); and U.S. patent application Ser. No. 14/035,474 for Augmented-Reality Signature Capture, filed Sep. 24, 2013 (Todeschini).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A near-field-communication (NFC) system, comprising:
   a plurality of indicia readers, each indicia reader configured to receive software-configuration data from another NFC-enabled device;
   a first NFC-enabled indicia reader of the plurality of indicia readers;
   a second NFC-enabled indicia reader of the plurality of indicia readers, the second NFC-enabled indicia reader configured to read machine-readable indicia and decode the machine-readable indicia, the second NFC-enabled indicia reader having software-configuration data that improves the accuracy of its ability to read and/or decode the machine-readable indicia;
   wherein the near-field-communication (NFC) system is configured to update the first NFC-enabled indicia reader with the software-configuration data of the second NFC-enabled indicia reader when the first NFC-enabled indicia reader is positioned in proximity to the second NFC-enabled indicia reader.

2. The near-field-communication (NFC) system according to claim 1, wherein the second NFC-enabled indicia reader is configured to transmit the software-configuration data to another NFC-enabled indicia reader of the plurality of indicia readers when in proximity to the another NFC-enabled indicia reader.

3. The near-field-communication (NFC) system according to claim 1, wherein the near-field-communication (NFC)

system is configured to automatically update the first NFC-enabled indicia reader with the software-configuration data of the second NFC-enabled indicia reader when the first NFC-enabled indicia reader is positioned in proximity to the second NFC-enabled indicia reader.

4. The near-field-communication (NFC) system according to claim 1, wherein the near-field-communication (NFC) system is configured to update the first NFC-enabled indicia reader with the software-configuration data of the second NFC-enabled device when (i) the first NFC-enabled indicia reader is positioned in proximity to the second NFC-enabled indicia reader and (ii) an operator of the first NFC-enabled indicia reader manually authorizes the first NFC-enabled indicia reader to receive and install the software-configuration data of the second NFC-enabled indicia reader.

5. The near-field-communication (NFC) system according to claim 1, wherein the near-field-communication (NFC) system is configured to update the first NFC-enabled indicia reader with the software-configuration data of the second NFC-enabled indicia reader when (i) the first NFC-enabled indicia reader is positioned in proximity to the second NFC-enabled indicia reader and (ii) a user of the second NFC-enabled indicia reader manually commands the second NFC-enabled device to transmit the software-configuration data to the first NFC-enabled device.

6. The near-field-communication (NFC) system according to claim 5, wherein the second NFC-enabled indicia reader comprises a graphical user interface (GUI) application and wherein the user of the second NFC-enabled indicia reader operates the graphical user interface (GUI) application to manually command the second NFC-enabled indicia reader to transmit the software-configuration data to the first NFC-enabled indicia reader.

7. The near-field-communication (NFC) system according to claim 5, wherein the second NFC-enabled indicia reader comprises a transmission-initiation switch and wherein the user of the second NFC-enabled indicia reader activates the transmission-initiation switch to manually command the second NFC-enabled indicia reader to transmit the software-configuration data to the first NFC-enabled indicia reader.

8. The near-field-communication (NFC) system according to claim 1, wherein the second NFC-enabled indicia reader comprises a mobile computer device.

9. A near-field-communication (NFC) system, comprising:
a plurality of NFC-enabled indicia readers each comprising a near-field communication (NFC) module and configured to receive software-configuration data from another NFC-enabled device;
a first NFC-enabled indicia reader of the plurality of indicia readers configured to read machine-readable indicia, decode the machine-readable indicia, and output the decoded information to a database, the first NFC-enabled indicia reader including software-configuration data that improves the accuracy of its ability to read and/or decode the machine-readable indicia;
wherein the near-field-communication (NFC) system is configured to update the other NFC-enabled indicia readers of the plurality of indicia readers with the software-configuration data of the first NFC-enabled device when the first NFC-enabled indicia reader is located in proximity to each of the respective NFC-enabled indicia readers of the plurality of indicia readers.

10. The near-field-communication (NFC) system of claim 9, wherein the first NFC-enabled device automatically transmits the software-configuration data to a second NFC-enabled indicia reader of the plurality of indicia readers when in proximity to the second NFC-enabled indicia reader.

11. The near-field-communication (NFC) system of claim 10, wherein a user of the first NFC-enabled indicia reader manually commands the first NFC-enabled indicia reader to transmit the software-configuration.

12. The near-field-communication (NFC) system of claim 9, wherein software configuration data of the first NFC-enabled device is loaded by a user of the first NFC-enabled indicia reader.

13. The near-field-communication (NFC) system of claim 9, wherein the first NFC-enabled indicia reader comprises a mobile computer device.

14. The near-field-communication (NFC) system of claim 9, wherein the first NFC-enabled device comprises an NFC-enabled barcode scanner.

15. A method for adjusting the configuration of a plurality of indicia readers, the method comprising:
reading machine-readable indicia with one indicia reader of the plurality of indicia readers, each indicia reader comprising a near-field communication (NFC) module;
decoding the read machine-readable indicia via the one indicia reader to create decoded information;
outputting the decoded information via the one indicia reader to a database;
adjusting a configuration setting for the one indicia reader to improve the accuracy of its ability to read and/or decode the machine-readable indicia;
when another indicia reader of the plurality of indicia readers comes into proximity of the one indicia reader, communicating the configuration setting via the respective NFC modules; and
adjusting the configuration setting for the another indicia reader.

16. The method according to claim 15, comprising:
when each of the remainder of the plurality of indicia readers comes into proximity of the one indicia reader, the another indicia reader, or yet another indicia reader that has already received the configuration setting, communicating the configuration setting via the respective NFC modules; and
adjusting the configuration setting for each of the remainder of the plurality of indicia readers that receives the configuration setting.

* * * * *